(12) United States Patent
Heffernan et al.

(10) Patent No.: US 6,968,378 B2
(45) Date of Patent: Nov. 22, 2005

(54) METHOD AND APPARATUS FOR IDENTIFYING PROCESSING UNITS TO A NETWORK USING NETWORK ADDRESSES OBTAINED FROM REMOVABLE DATA CARRIERS

(75) Inventors: Peter Heffernan, Hampshire (GB); James E. King, Surrey (GB); Rhod J. Jones, Berkshire (GB); Robert Littlewood, Newcastle Upon Tyne (GB)

(73) Assignee: Sun Microsystems, Inc., Santa Clara, CA (US)

(*) Notice: Subject to any disclaimer, the term of this patent is extended or adjusted under 35 U.S.C. 154(b) by 796 days.

(21) Appl. No.: 09/943,181

(22) Filed: Aug. 30, 2001

(65) Prior Publication Data

US 2002/0083176 A1  Jun. 27, 2002

Related U.S. Application Data

(63) Continuation-in-part of application No. 09/804,614, filed on Mar. 12, 2001.

(51) Int. Cl.$^7$ ............................................ G06F 15/173
(52) U.S. Cl. ..................... 709/225; 709/208; 709/227; 709/228; 709/229
(58) Field of Search ..................... 709/203, 225–229, 709/208–211, 220–222; 235/379–380, 375, 235/487; 455/557–558; 707/8–10, 104.1

(56) References Cited

U.S. PATENT DOCUMENTS

| 4,774,399 | A |   | 9/1988  | Fujita et al. |
| 5,420,572 | A |   | 5/1995  | Dolin, Jr. et al. |
| 5,691,525 | A | * | 11/1997 | Aoki et al. .................. 235/379 |
| 5,803,762 | A |   | 9/1998  | Green |
| 5,812,533 | A | * | 9/1998  | Cox et al. ................... 370/259 |
| 5,881,235 | A |   | 3/1999  | Mills |
| 5,889,266 | A | * | 3/1999  | Schrenk ...................... 235/380 |
| 5,899,998 | A | * | 5/1999  | McGauley et al. ...... 707/104.1 |

(Continued)

FOREIGN PATENT DOCUMENTS

EP          0 556 148         1/1993

(Continued)

OTHER PUBLICATIONS

European Search Report Application No. GB0101215.2 mailed Mar. 28, 2002.

(Continued)

*Primary Examiner*—Bharat Barot
(74) *Attorney, Agent, or Firm*—Meyertons Hood Kivlin Kowert & Goetzel, P.C.; B. Noël Kivlin

(57) ABSTRACT

A processing unit is connectable to a communications network. The processing unit has a data carrier reader operable to read a network identity from a portable data carrier. The processing unit is operable on being powered up to check for the presence of a said data carrier, and when a data carrier is present to use the network identity from the data carrier for communicating via the network. The data carrier can be in the form of a card having readable storage, for example a portable storage device having a readable semiconductor memory of a type know, for example, as a smart card, or memory card. The processing unit may be arranged to use only the network address read from the data carrier, and, in the absence of such a data carrier to prevent access to the network. Access to the network can be achieved by aborting the power up of the processing unit. The processing unit may therefore access the network only when the network address is present in the carrier reader when the processing unit is powered up.

24 Claims, 10 Drawing Sheets

U.S. PATENT DOCUMENTS

| | | | |
|---|---|---|---|
| 6,016,255 A * | 1/2000 | Bolan et al. | 361/807 |
| 6,094,656 A * | 7/2000 | De Jong | 709/207 |
| 6,138,918 A * | 10/2000 | Tarbouriech | 235/492 |
| 6,370,374 B1 * | 4/2002 | Eichinger et al. | 455/411 |
| 6,374,110 B1 * | 4/2002 | Parker et al. | 455/445 |
| 6,385,645 B1 * | 5/2002 | De Jong | 709/227 |
| 6,851,614 B2 * | 2/2005 | Garnett | 709/220 |

FOREIGN PATENT DOCUMENTS

| | | |
|---|---|---|
| EP | 0 899 925 | 8/1998 |
| GB | 2 338 159 | 12/1999 |
| GB | 2 342 091 | 4/2000 |
| JP | 05091111 | 4/1993 |
| JP | 06-156152 | 7/1994 |
| WO | 98/38761 | 9/1998 |
| WO | 98/57474 | 12/1998 |
| WO | 00/27093 | 5/2000 |

OTHER PUBLICATIONS

International search report application No. PCT/US01/25281 mailed Dec. 14, 2001.

International search Report Application No. GB0021456.9 mailed Oct. 30, 2001.

European Search Report Application No. GB0101215.2 mailed Mar. 28, 2002.

* cited by examiner

METHOD AND APPARATUS FOR IDENTIFYING PROCESSING UNITS TO A NETWORK USING NETWORK ADDRESSES OBTAINED FROM REMOVABLE DATA CARRIERS

This application is a Continuation-in-Part of Ser. No. 09/804,614 filed Mar. 12, 2001.

BACKGROUND OF THE INVENTION

The present invention relates to computer systems, and in particular to computer systems having processing units, which are connectable to a communications network via which data may be communicated.

There are many fields in which mankind has become reliant on computers to perform valuable and sometimes essential functions. The reliance on computer systems demands that the down time of a computer system is as small as possible. The down time of a computer system is a period during which a computer system is inoperable as a result of a fault in the system. If a computer system goes down, the inconvenience and loss of revenue caused can be substantial. For example, if a computer system is operating as a server or exchange forming part of a telecommunications system, then during the down time no communications can be performed using the telecommunications system, which can result in a considerable loss of business and therefore revenue for an organization. Computer systems are therefore arranged to be as reliable as possible, so that the down-time is reduced to a minimum. Accordingly, the up-time of a computer system is required to be in the order of 99.9995%, which equates approximately to a down-time of a few seconds per year.

Computer systems are designed and manufactured to standards that reduce as far as possible the likelihood of malfunction. However, in order to minimize any down-time, which may occur as a result of a malfunction, it has been proposed to design parts of the computer system such that the parts can be replaced as quickly as possible with a part which performs the same function. For example, a processing unit, which includes for example a hard-disc drive, can be arranged to be replaceable. The processing unit often forms part of a computer system that executes software processes that control the computer system. As such, when a malfunction occurs in the processing unit, the unit is replaced by an equivalent processing unit. To this end, the hard-disc of the unit is often provided with pre-loaded software that is equivalent to the software processes loaded onto the original hard-disc. The original processing unit may then be repaired off-line, which is particularly advantageous because the repairs can be time consuming.

Computer systems often include, or are arranged to be connectable to a communications network. This can be used to effect communications between different parts of the computer system, the communications network being a local bus, or communications between different computer systems, the communications network being a local area network or the like.

In order to effect replacement of a processing unit, the replacement processing unit should be arranged to communicate via the communications network, in substantially the same way as the original processing unit communicated. In order to minimize down time, it is desirable that the replacement is made as quickly and efficiently as possible.

SUMMARY OF THE INVENTION

An aspect of the invention provides a processing unit connectable to a communications network. The processing unit has a data carrier reader operable to read a network identity from a portable data carrier. The processing unit is operable on being powered up to check for the presence of a data carrier, and, when a data carrier is present, to use the network identity from the data carrier for communicating via the network.

Communications networks operable under, for example, an Ethernet protocol or the like, communicate data via a common medium to devices attached to the medium, by appending the data to network identities (e.g., network addresses) which the devices recognise. Each device that is arranged to communicate using a particular network standard such as the Ethernet is therefore provided with a unique address, so that the device may communicate via any network conforming to that standard. Typically devices forming part of a computer system are provided with a communications card such an Ethernet card embodying the network address. Once the device has been connected to the communications network, the network address for that device will be used by all other devices connected to the communications network. This is typically arranged by the operating system that receives the network addresses from the devices and passes the addresses via a device tree and stored so as to provide configuration information to enable communication via the network.

As with other devices, processing units are arranged to communicate via a communications network and so are provided with a network address, which is generally embodied within a memory unit of the processing unit. If a processing unit is replaced by another processing unit, the communications network and the devices connected to the communications network, will not recognise that processing unit and so will be unable to communicate with the processing unit.

An embodiment of the invention addresses the technical problem of providing an arrangement in which a replacement processing unit may continue communicating via a communications network, by providing a processing unit with a data carrier reader arranged to read a portable data carrier bearing a network address that can readily be moved between processing units. As such once the original processing unit has been replaced, the replacement processing unit can be arranged to use the network address of the original processing unit by reading this network address from the data carrier through the data carrier reader. The communications network and the other devices connected to the communications network are therefore unaware that the original processing unit has been replaced. The replacement processing unit can continue communicating via the network with the same address as the original processing unit, without any further re-configuration or requirement to recognise a new network address.

The invention can be applied to a device that is connectable to a communications network and is provided with sufficient processing facility to use the network identity from a data carrier rather than a pre-designated network identity. As such, it will be understood that the term 'processing unit', as used herein refers to and includes any component of a computer system that is connectable to a communications network and is provided with a facility for using a network identity read from a data carrier rather than a pre-designated network identity.

The data carrier reader is arranged to read a portable data carrier. The data carrier can have a form in which a user may manually insert the data carrier into the data carrier reader by hand without the use of a tool or without any adaptation or arrangement which is required to insert the data carrier into the reader by any other means other than with the human hand alone (i.e. it is hand held and hand insertable). In such a case the data carrier is therefore of a form in which it is readily insertable and removable by the human hand.

The data carrier may be in the form of a card having readable storage, for example a portable storage device having a readable semiconductor memory of a type know, for example as a smart card, or memory card. A data carrier reader appropriate for reading the chosen form of smart card or memory card is provided. The form of the card could be that of a standard smart, or memory card (i.e. credit card sized), or it could take other configurations such as that of a Subscriber Identity Module (SIM) card or the like and the data carrier reader then being arranged to receive and read such a SIM card.

The processing unit may be arranged to use only the network address read from the data carrier, and, in the absence of such a data carrier, to prevent access to the network. Access to the network can be achieved by aborting the power up of the processing unit. The processing unit may therefore access the network only when the network address is present in the carrier reader when the processing unit is powered up.

The processing unit may be provided with a security fixing that is arranged to hinder removal of the data carrier from the data carrier reader. As such, the data carrier may be secured in the data carrier reader to hinder unauthorised or accidental removal of the data carrier.

The processing unit can be replaceably mountable in a chassis arranged to receive the processing unit. If the processing unit malfunctions, then the processing unit can be readily replaced with a corresponding replacement processing unit, which is exchanged with the original processing unit in the chassis. The processing unit can be in the form of a computer server, for example a rack-mountable computer server.

Another aspect of the invention provides a method of operating a processing unit connected to a communications network, said processing unit having a data carrier reader for reading a data carrier carrying a network identity for use in communicating via said network. The method comprises the processing unit, on being powered up: checking for the presence of a said data carrier; and when a data carrier is present, using the network identity from the data carrier for communicating via the network.

A further aspect of the invention provides a portable data carrier configured to be removably inserted in a data reader of a processing unit connectable to a communications network, the data carrier carrying a network identity for the processing unit to use for communicating via the network, the data carrier being readable by processing unit on being powered up when the data carrier is present, whereby the network identity from the data carrier is used by the processing unit for communicating via the network

BRIEF DESCRIPTION OF THE DRAWINGS

Embodiments of the invention are described hereinafter, by way of example only, with reference to the accompanying drawings in which like reference signs relate to like elements and in which.

DESCRIPTION OF THE PARTICULAR EMBODIMENTS

Figure 1:
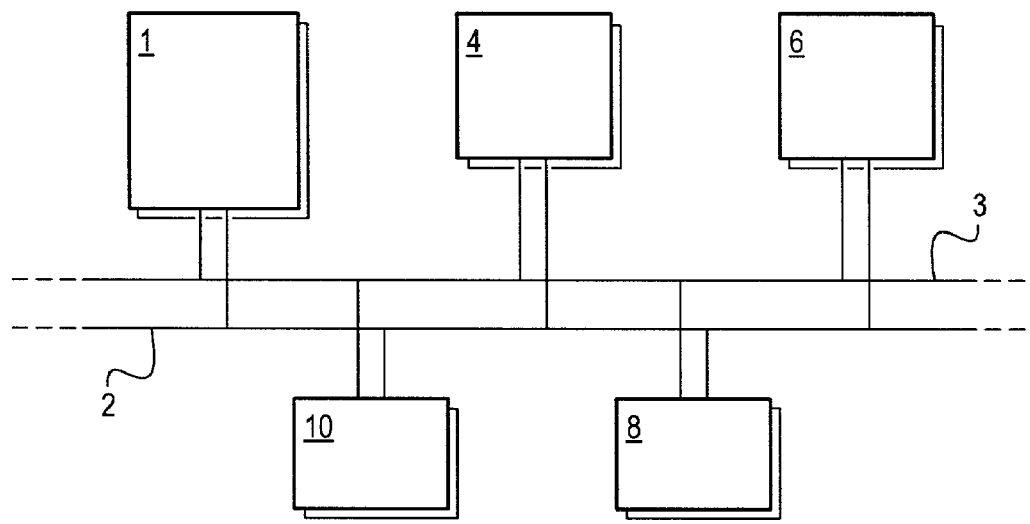
FIG. 1 is a schematic block diagram of a computer system.

A somewhat simplified block diagram of a computer system is shown in FIG. 1 that includes a processing unit 1 connected to a data communications network 2. Also connected to the data communications network 2 is a further processing unit 4, and other peripheral devices including a printer 6 and further workstations 8, 10. It will be appreciated that these are just examples of devices communicating via the data communications network, and other servers connected to other DTE equipment may be also communicate data via the network. Accordingly the data communications network may be a LAN, WAN or the Internet.

Figure 2:
FIG. 2 is an illustrative representation of an Ethernet data packet.

The computer system shown in FIG. 1 is provided as an example only. However the computer system shown in FIG. 1 illustrates an arrangement in which devices are designed to communicate data via a data communications network 2. The data communications network 2 may operate in accordance with an Ethernet protocol in which data is communicated via an Ethernet cable which provides a common medium through which all devices connected to the medium can receive and transmit data. Data to be communicated to a particular one of the devices connected to the network is detected and received by that device by an Ethernet address appended to the data. A conceptual diagram of the structure of an Ethernet packet is shown in FIG. 2 where a first field A represents the address of the device to receive the data and a second field D represents the data being communicated.

The computer system may also include a second communications network 3, which may be provided for reasons which will be explained shortly.

The present invention finds application in facilitating communications via a data communications network, in particular, where a device coupled to the network is replaced by another replacement device. Any one of the devices shown in FIG. 1 may be a device embodying the present invention. However as an illustration the processing unit 1 will be used in the following description as a device embodying the invention.

Figure 3:
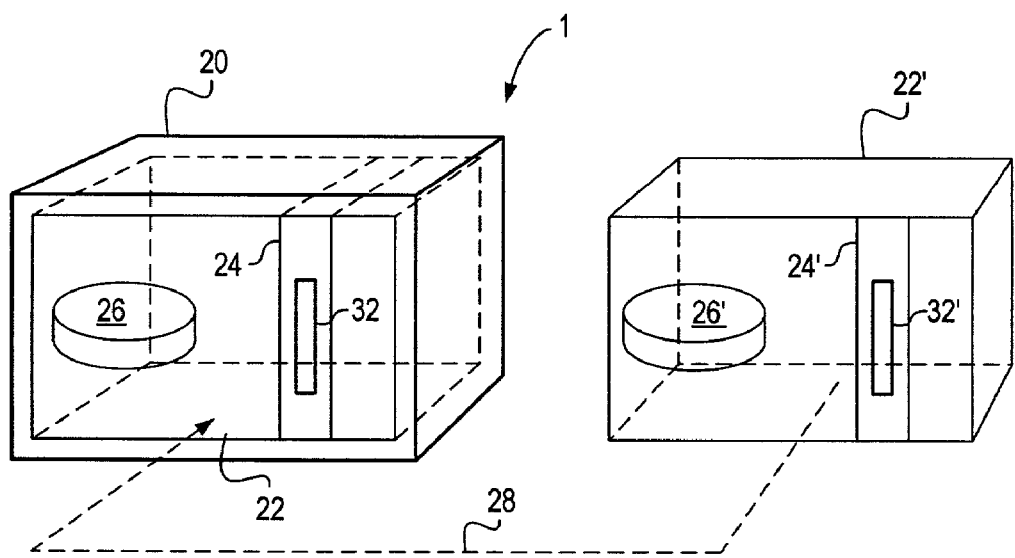
FIG. 3 is an aspect view of a schematic representation of a processing unit that is replaceably mountable within a chassis.

In FIG. 3 processing unit 1 is shown to comprise a chassis 20 in which there is replaceably mounted a processing unit 22. The processing unit 22 is shown to include a motherboard 24 and a hard disk drive 26 although it will be appreciated that the processing unit 1 may comprise other parts that are not shown in FIG. 3.

The present invention finds particular application when a device has malfunctioned and must be replaced in order to, as far as possible, minimise the down time of the computer system. To this end the processing unit 1 shown in FIG. 3 is arranged so that if a malfunction occurs, the processing unit 22 may be removed and replaced by a corresponding processing unit 22' which performs an equivalent function. As such the hard disk 26 may include identical software to that loaded onto the hard disk of the original processing unit 22. Thus, as indicated by the arrow 28, the replacement unit 22' can be slotted in place of the original processing unit 22 and arranged to perform the same function of the original processing unit thereby minimising the down time.

As already explained, a technical problem addressed by embodiments of the present invention is to provide an arrangement in which the replacement processing unit 22' may continue communicating using the data communications network 2 without requiring a reconfiguration of the network. This is because an operating system running on the processing unit receives the network addresses of each device in the computer system via device tree. The network addresses of the devices are usually maintained for each of the devices by the operating system, unless and until the network is re-configured. The addresses of the devices connected to the network are established once by the operating system, using the device tree. Thereafter to effect communication via the network, the same network address for a particular device is always used.

Conventionally devices to be connected to a communications network are provided with a unique network address from the manufacturer that is fixed throughout the lifetime of the component. As a result the device may be connected to any data communications network conforming to the same standard for which the device has been configured to effect data communications. However, when one device is replaced by another, communications via the data communications network can not be made, because the replacement device will have a different network address from that of the original device.

Embodiments of the present invention provide an arrangement in which data communications via the network can continue after a device has been replaced. This arrangement provides continued communications, without the devices comprising the computer system having to change the address to which data destined for that device is communicated, which would be required if the network were to be re-configured.

As shown in the example of FIG. 3, the motherboard 24 includes a data carrier reader having a receiving gap 32 through which a data carrier may be received and read by the data carrier reader. A better understanding of the arrangement of the motherboard 24 is provided through an illustration of an example embodiment shown in FIG. 4 where parts also appearing in FIG. 3 bear the same numerical designation.

Figure 4:
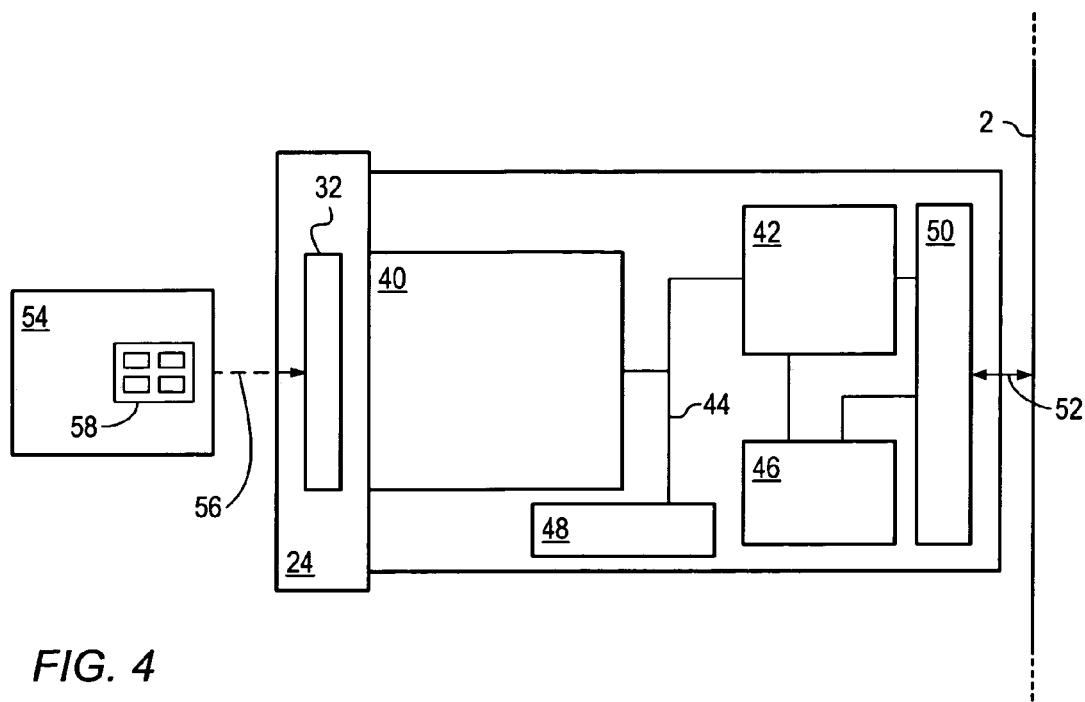
FIG. 4 is a part aspect view, part block diagram of a motherboard forming part of an example processing unit, shown in FIG. 3, embodying the present invention.

In an example of a processing unit represented schematically in FIG. 4, a motherboard 24 has a data carrier reader 40 that is connected to a CPU 42 on the motherboard via a local bus 44. The local bus 44 may be for example an I2C bus. The motherboard also includes a non-volatile random access memory (NVRAM) 46 also connected to the CPU 42. The motherboard 24 also includes a boot programmable read only memory (PROM) 48 which is connected via the I2C bus 44 to the CPU 42 and communications port 50 which is connected via connector 52 to the data communications network 2. Also shown in FIG. 4 is a data carrier 54 illustrated by an arrow 56 to be received in the data carrier reader 40.

The data carrier in the present example is a so-called memory card that includes storage 58 in which a network identity for the processing unit (e.g., a Media Access Control (MAC) address) is held. The storage could be in the form of a Read Only Memory (ROM) 58. The memory card can have, for example, the standard dimensions of a conventional credit card, with the configuration of standard memory or smart card of those dimensions. Alternatively, it could have other dimensions, for example that of a Subscriber Identity Module (SIM) or the like, or a MEMORY STICK (RTM) or the like.

Although the particular example of a data carrier used in the present example is a simple memory card, in other embodiments a smart card that includes processing logic (e.g., a microprocessor or microcontroller) as well as the storage could be used. In the following description, the term smart card is used, as is common in the art, to include both smart cards that include such processing logic and memory cards that do not include such logic. However it will be appreciated that the smart card 54 is only one example of a data carrier which is hand held and hand insertable into and removable from the reader 40 and other embodiments may use other data carriers having other formats An example of the operation of the processing unit described with reference to FIG. 4 will now be explained. In order to provide a facility through which the replacement processing unit 22' may use the same network address as the original processing unit 22, data representing the network address is pre-stored in the smart card 54. As such, when the processing unit 22 is replaced, the smart card 54 may be removed from the smart card reader 40 on the motherboard 24 and introduced into the corresponding smart card reader 40 of the motherboard 24 in the replacement processing unit 22'.

Following power-up of the computer system 1, the CPU 42 on the motherboard reads instructions from the boot PROM 48. In accordance with these instructions the CPU 42 operates to interrogate the smart card reader 40 via the I2C bus 44 to ascertain whether or not a smart card is present in the smart card reader 40. If the smart card is present, the CPU 42 operates to read the network address from the smart card 54 and to configure the communications port 50 with this network address. The address is then used to update a device tree providing a list of the network addresses of the devices connected to the network, with this address. Thereafter, data communications are effected via the data communications network 2 through the link 52 using the address supplied from the smart card 54.

Accordingly, it will be appreciated that for the network 2 and the other devices 4, 6, 8, 10 communications are unaffected, and apart from the period during which the original processing unit 22, is replaced by the processing unit 22', communications via the network are substantially uninterrupted.

Figure 5A:
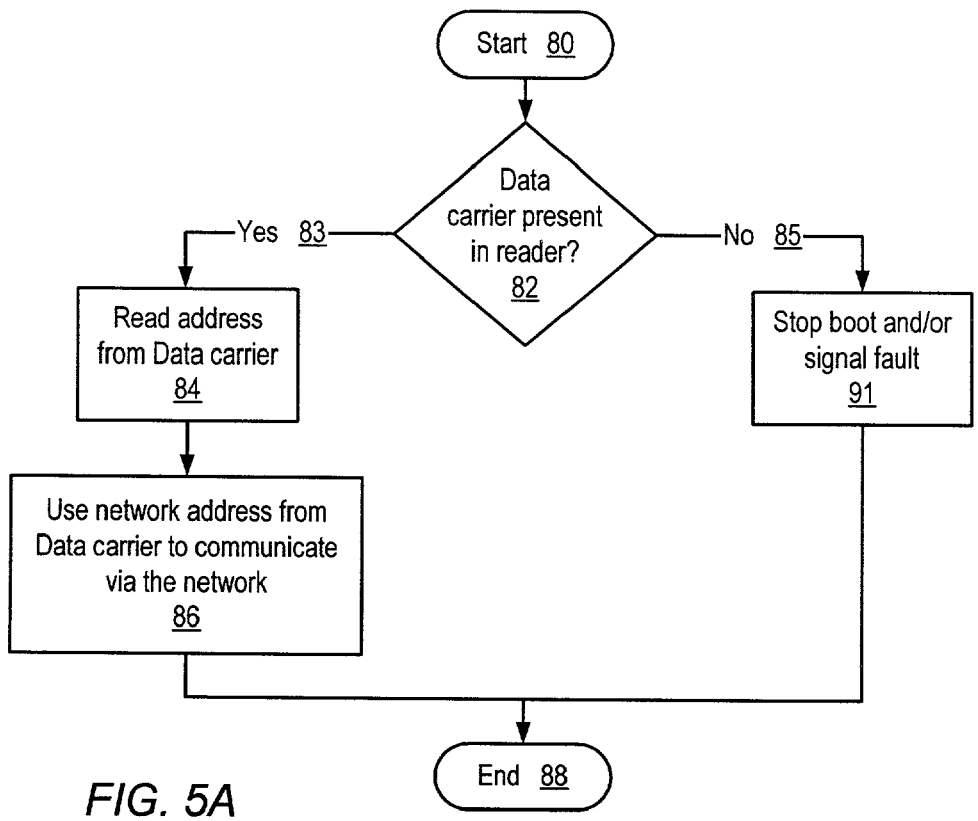
FIG. 5A is a flow diagram representative of one example of operation of the processing unit according to FIG. 4.

An example of the operation of the processor 42 on reading the code in the boot PROM 48 is summarised by the flow diagram shown in FIG. 5A. In FIG. 5A at the start of the process 80 the processor reads the boot PROM 48 and performs the following steps.

At decision step 82 the processor determines whether there is a smart card present in the smart card reader 40. If the smart card is present then the processor operates at step 84 to read the network identity from the smart card. At process step 86 the processor configures the communications port 50 to use the network identity from the smart card to communicate via the network. At this point the process terminates 88.

If the smart card is not present in the smart card reader then the processing unit is operable to prevent the processing unit connecting to the network in step 91. This can be achieved, for example by terminating the boot operations (e.g., by powering down the processing unit) and/or signalling a fault state.

Once the processor 42 has read the boot PROM 48 and configured the communications port 50 with the network identity, the processor probes all the devices and passes the results of the probe to the operating system via a device tree. As will be appreciated, the address of the processing unit comprising the motherboard is particularly important to the computer system because this represents the root level Media Access Control (MAC) address of the computer system.

An advantage of preventing the connection for the processing unit to the network in the absence of a processing card mans that network integrity can be achieved on the basis of a set of network identities provided on respective data carriers. The processing units do not need to be provided with a separate predetermined network identities held, for example in NVRAM within the processing units, and the total set of network identities needed to provide network integrity can be keep as small as possible. In other words, if NVRAMs were provided in addition, then each network identity on the data carriers would need to be unique with respect to each of the network identities held in NVRAM in the respective processing units.

Figure 5B:
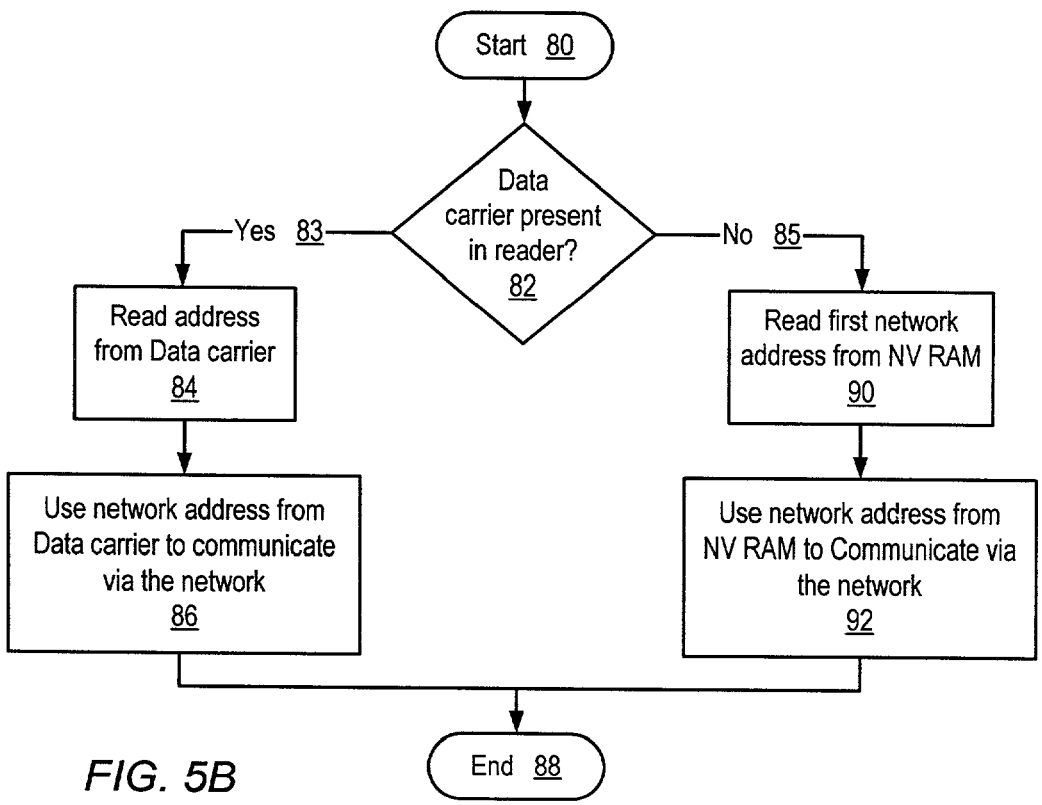
FIG. 5B is a flow diagram representative of another example of operation of the processing unit according to FIG. 4.

FIG. 5B illustrates a example of the method of operation of the example of FIG. 4, where a default network identity is held in storage (e.g., in NVRAM) in the processing unit. This does mean that additional network identities are needed to be able to ensure network integrity, but it also means that the processing unit can be powered up when a data carrier is not present. In this case the NV RAM 46 on the motherboard can be arranged to store the default network identity, which would be pre-designated and pre-loaded into the NVRAM 46 by the manufacturer of the motherboard 24 and would not be transportable between systems. In such a case, in the event that the smart card 54 is not present in the smart card reader 40, then the default network identity from the NVRAM 46 could be used by the motherboard to communicate via the network 2.

In FIG. 5B at the start of the process 80 the processor reads the boot PROM 48 and performs the following steps. At decision step 82 the processor determines whether there is a smart card present in the smart card reader 40. If the smart card is present then the processor operates at step 84 to read the network identity from the smart card. At process step 86 the processor configures the communications port 50 to use the network identity from the smart card to communicate via the network. At this point the process terminates 88. If the smart card is not present in the smart card reader then the processor operates to read the first network identity from the NVRAM 46 at process step 90. The processor then operates to use the first network identity from the NVRAM 46 to configure the communications port 50 to communicate using the first network identity via the communications network 92. The process then terminates 88.

Figure 6:
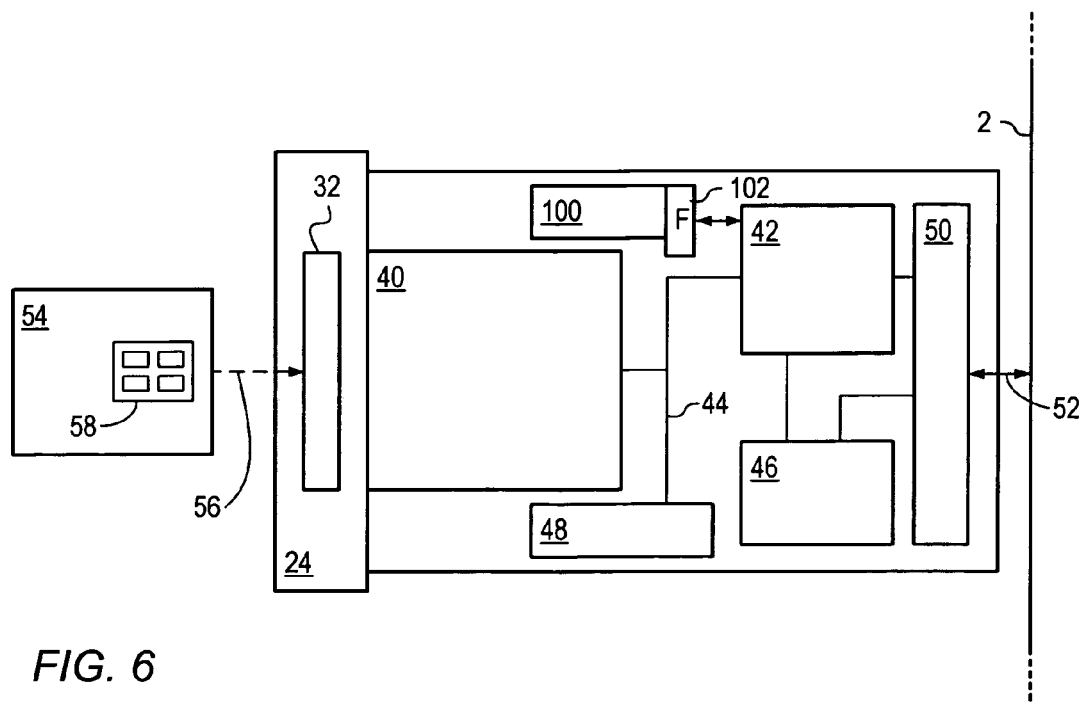
FIG. 6 is a part aspect view, part block diagram of a motherboard forming part of a further example processing unit shown in FIG. 3, embodying the present invention.

A further example of a processing unit is shown in FIG. 6 in which parts which also appear in FIG. 4 are given the same numerical references. FIG. 6 corresponds substantially to FIG. 4 so only the differences will be explained.

In addition to the components shown in FIG. 4 on the motherboard 24, the motherboard 241 shown in FIG. 6 also includes a network address register 100 which includes a register set flag 102. The network address register 100 could form part of the CPU 42 or may also form part of the communications port 50. The network address register 100 is used to store the network address read from the smart card 54. Once the address has been read from the smart card 54 then the register set flag 102 will be set to indicate that there is a network address present in the register 100 by setting the flag accordingly to, for example, F=1. The network address register 100 provides a further advantage in that the network card may be removed from the network card reader 40 after the network address has been successfully read by the CPU 42. Thereafter upon system initialisation, as before the CPU reads the initialisation code from the boot PROM 48.

The boot PROM 48 includes initialisation code that instructs the CPU to determine whether the register flag 102 is set. If the register flag is set (F=1) then the CPU 42 reads the network address from the register 100 and configures the communications port 50 as before with this network address. If the register flag 102 is not set (F=0) then the CPU operates to determine whether the smart card 54 is present in the smart card reader 40. If it is present then as before the CPU reads the network address from the smart card and configures the communications port 50 accordingly. However, in addition the CPU 42 then writes the network address from the smart card into the network address register 100 and sets the register flag 102 to indicate the presence of the address (F=1). Thereafter, the CPU will read the network address form the address register 100 rather than the smart card reader therefore providing greater flexibility of not requiring the presence of the smart card 54 in the reader 40. Furthermore, an advantage is provided in that should the smart card 54 be unintentionally or deliberately (as a result of a mischievous act) removed from the smart card reader 40 then the processing unit 22 may continue operating with the correct network address without the presence of the smart card 54.

Figure 7A:
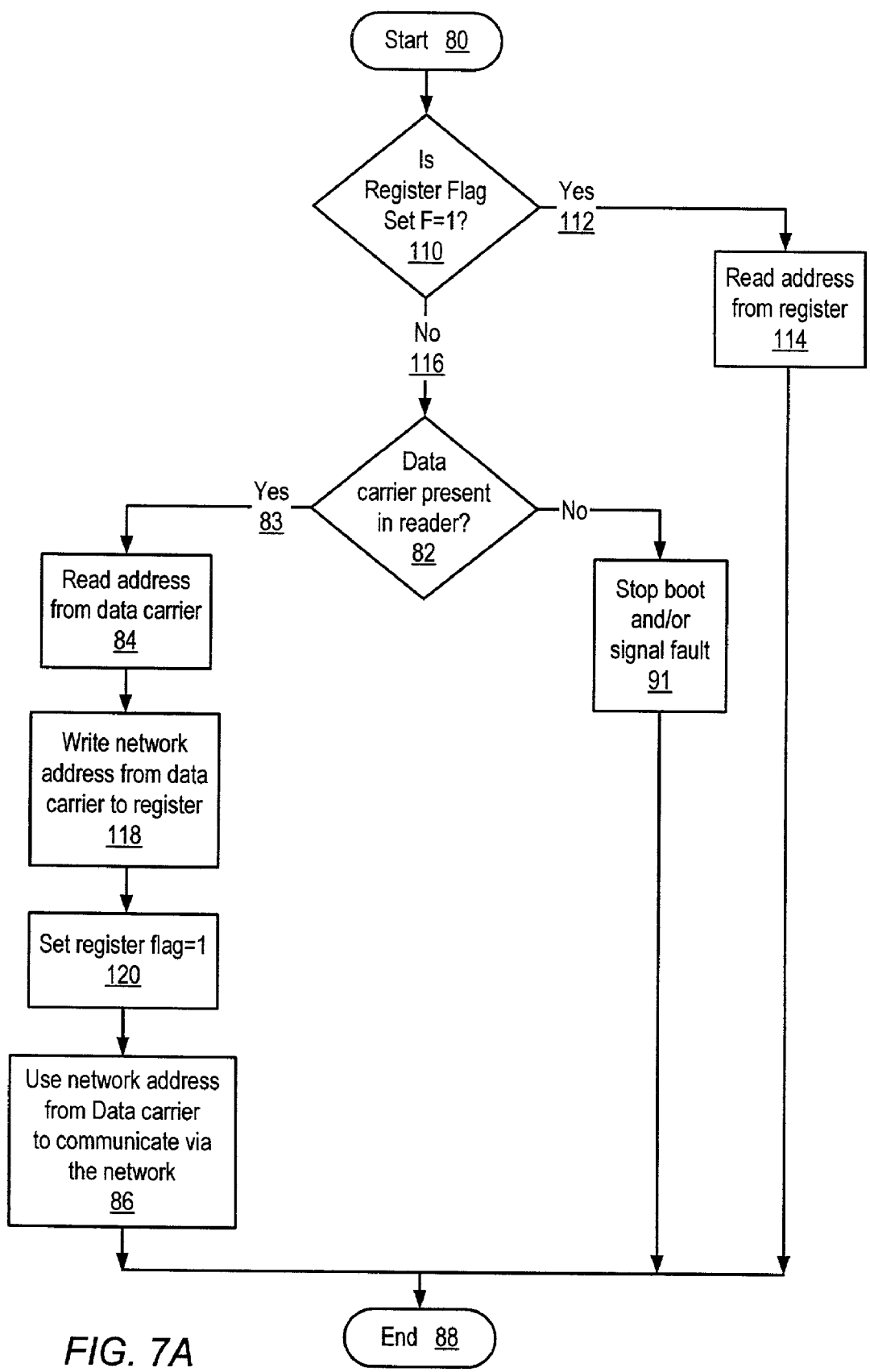
FIG. 7A is a flow diagram representative of one example of operation of the processing unit according to FIG. 6.
Figure 7B:
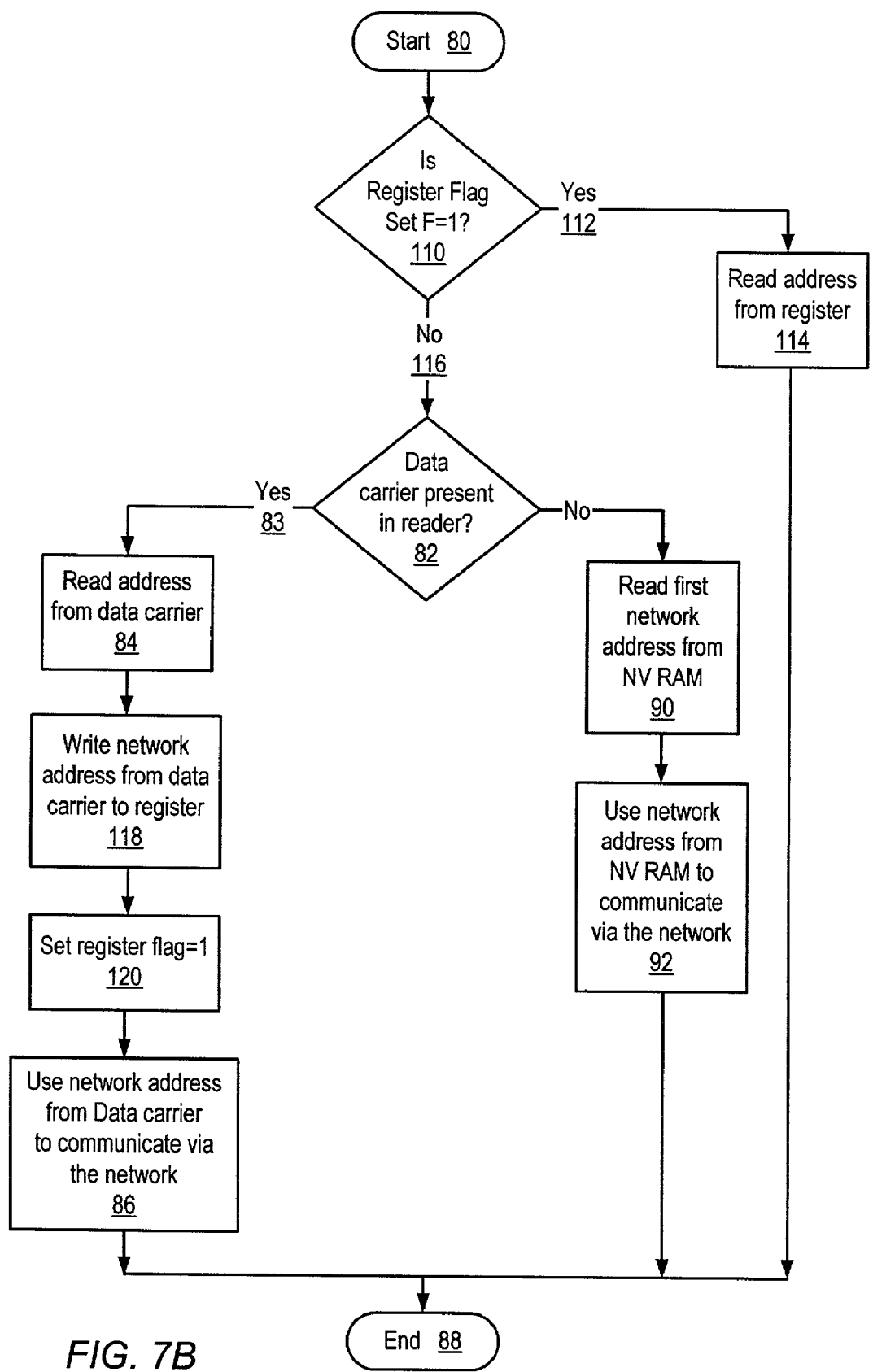
FIG. 7B is a flow diagram representative of another example of operation of the processing unit according to FIG. 6.

Example of the operation of the example of a processing unit as shown in FIG. 6 are summarised by the flow diagrams shown in FIGS. 7A and 7B. The process steps shown in the flow diagram 7A and 7B that also appear in the flow diagram of FIGS. 5A and 5B, respectively, are provided with the same numerical references. Correspondingly, only the different steps will be explained. It will be appreciated that FIG. 7A is based on FIG. 5A and FIG. 7B is based on FIG. 5B.

With reference in particular to FIG. 7A, following the start of the initialisation process in which the CPU 42 reads the initialisation code from the boot PROM 48, the CPU 42 is instructed to determine whether the register flag 102 is set (F=1). This is represented by decision step 110. If the flag is set then decision path 112 is followed and the CPU 42 then reads the network address from the register 100 and configures the communications port 50 accordingly. This is represented by process 114. Processing then terminates 88. If however the register flag is not set (F =0) then decision path 116 is followed. Decision path 116 then feeds into the decision step 82 in which the CPU ascertains whether or not the smart card is present in the reader. If the smart card is not present then processing continues with process step 91 and terminates at step 88 as in FIG. 5A. If however the smart card is present in the reader then decision path 83 is followed and the CPU reads the network address from the smart card 54. The CPU 42 then writes the smart card address into the address register 100 at process step 118. The CPU then sets the register flag to indicate the presence of the address (F=1) 120. The processing then proceeds with process step 86 and terminates at process 88 as with FIG. 5A.

Once the CPU 42 has read the boot PROM 48 and configured the communications port 50 with the network address, the CPU probes all the devices and passes the results of the probe to the operating system via a device tree. In an alternative embodiment of the present invention, the network address, which may be a MAC address, may be over written into the NVRAM. As will be appreciated the address of the processing unit comprising the motherboard is particularly important to the computer system because this represents the root level MAC address of the computer system.

It will be appreciated that FIG. 7B differs from FIG. 7A in the same way that FIG. 5B differs from FIG. 5A. Accordingly, reference is made to the description of FIG. 5B above for an explanation of the differences.

The processing unit may be provided with more than one communications port for connection to more than one data communications network. This is shown in FIG. 1 as the second communications network 3. This may be provided on the motherboard in order to increase redundancy so that if one communications networks should fail then data communications may be made via the other communications network. This may also be required in order to increase the bandwidth which may be communicated to the motherboard. Another reason for providing two networks would be to allow for two separate networks to be established. One network may be used for system administration and one for network communications, which may include internet access. The administration may be performed by a management network. Therefore the communications port is arranged to provide multiple Ethernet ports through which data may be communicated in parallel. Accordingly, the smart card for this further embodiment will include a second network address for use in communicating via the second network, and the NVRAM may include a second initial network address.

Figure 8:
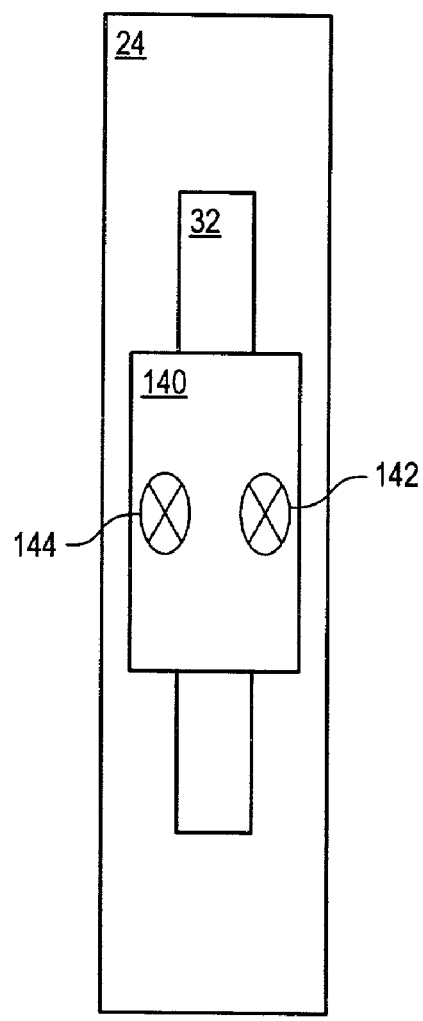
FIG. 8 is a schematic diagram illustrating an arrangement of a data carrier reader mounted on a motherboard.

A further aspect of the present invention is illustrated in FIG. 8 where parts also appearing in FIG. 4 bear the same numerical references. In FIG. 8 the front of the motherboard 24 in which the receiving slot 32 formed is shown to include a security barrier 140 which covers the front of the receiving slot 32 of the motherboard 24 so as to obstruct the receiving slot 32. The barrier 140 is secured in place by fixing screws 142, 144 which may be shaped and configured to prevent removal of the fixing screws 142, 144 without provision of a correspondingly configured removing tool. The arrangement of the barrier 140 and the fixing screws 142, 144 is provided to prevent the smart card 54 from being removed from the smart card reader 40. Alternatively, for the embodiment shown in FIG. 6 the barrier 140 and fixing screws 144, 142 are arranged to prevent an incorrect smart card being introduced into the smart card reader 40 after the motherboard has already been configured with the correct network address which has been loaded into the address register 100.

Figure 9:
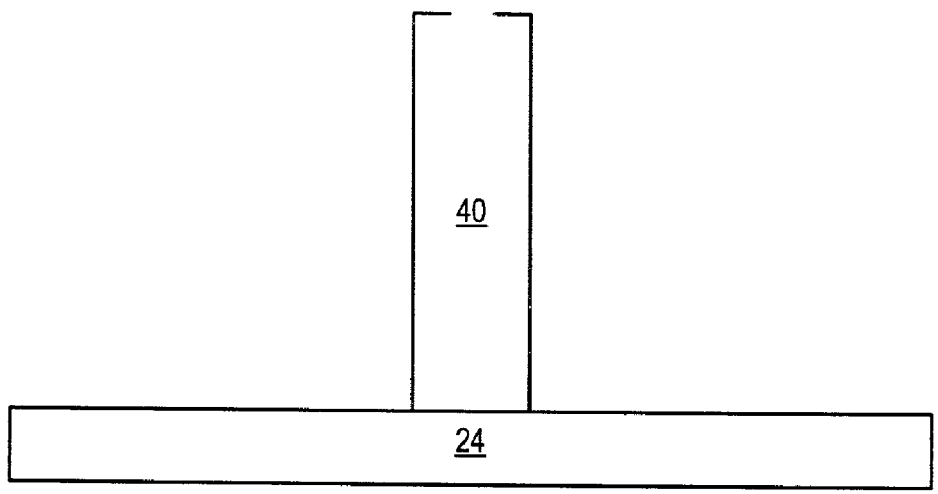
FIG. 9 is a schematic diagram illustrating a security fixing on a receiving slot of a data carrier reader.

Although the smart card reader 40 shown in FIGS. 4 and 6 is mounted with the plane of the smart card substantially parallel to the plane of the motherboard, alternative arrangements are possible and will be determined by the mechanical requirements for mounting the smart card reader on the motherboard. As such an alternative arrangement is shown in FIG. 9 in which the smart card reader 40 is mounted perpendicularly to the plane of the motherboard 24.

Figure 10:
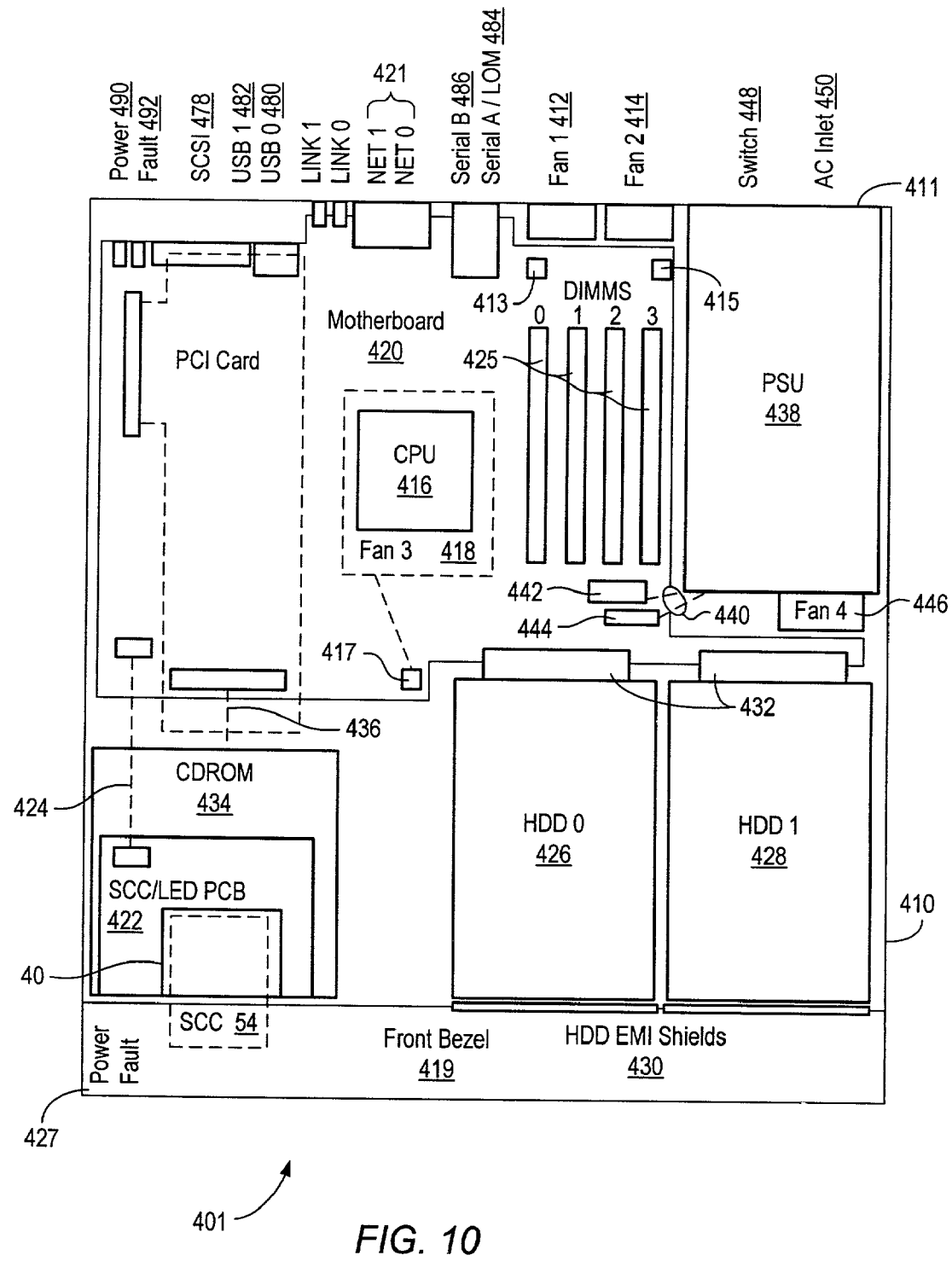
FIG. 10 is a schematic representation of an example of a processing unit incorporating the invention.

FIG. 10 illustrates a further example of a processing unit according to the invention. FIG. 10 is a physical plan view of a narrow form factor computer system 401 designed for rack mounting that implements an embodiment of the invention. This example of a processing unit provides a compactly configured computer server offering high performance at reasonable cost.

The computer system 401 comprises an enclosure 410 with a front bezel 419 that is removable for front access to the disk drives and a portable storage device 54 and device reader 40.

The data carrier or portable storage device 54, which can be implemented, for example, as a smart card or a memory card, is known as a System Configuration Card (SCC) in the context of this example.

Rack mounting is supplied for standard 19" racks via right-angled flanges (not shown). Slide-rail support is also provided.

The enclosure 410 is cooled, from front to rear, by two system fans 412, 414 mounted on a rear panel of the enclosure, with venting in the front and rear panels as required. The host processor (CPU) 416 also has its own dedicated local cooling comprising an impingement fan 418 that clips onto the CPU socket. These three fans plug directly into the motherboard 420 at 413, 415 and 417, respectively. The motherboard 420 is a PCB assembly, designed in a custom form-factor to fit the enclosure 410. The shape of the motherboard is chosen so as to minimise cabling within the enclosure. The motherboard 420 carries the majority of circuitry within the computer system 401.

All external interfaces are included directly on the rear edge of the motherboard, for access through the rear-panel 411 of the enclosure 410. The external interfaces comprise two network interfaces 421, two serial interfaces 484, 486 and a Small Computer System Interface (SCSI) interface 478. Indicators (e.g., LEDs) for Power, Fault and Network Link status are also positioned at the rear of the enclosure. These can include a power LED 490 that is illuminated when the processing unit is powered and a fault LED 491 that can be operated (e.g., illuminated or flashed) to indicate a fault condition.

A system, or host, processor (CPU) 416 for the computer system 401 is mounted in a standard zero insertion force (ZIF) socket on the motherboard 420. It has a passive heat sink. Dual in-line memory modules (DIMMs) are mounted in sockets 425 on the motherboard 420. A small printed circuit board (PCB) 422 is included at the front of the enclosure 410 to carry a System Configuration Card (SCC) reader 40 and LEDs 427 for Power and Fault status indication. A 10-way ribbon cable 424 connects this PCB to the motherboard 420. Two SCSI hard disk drives 426 and 428 are mountable in respective bays to the front of the motherboard 420. The drives are hot-pluggable and are accessible by removal of the front bezel 419 and EMI shields 430. The two internal SCSI hard disk drives 426 and 428 plug directly into the motherboard via right-angled connectors 432 located on the front edge of the motherboard 420.

A slim (notebook-style) CDROM drive bay is provided, mounted laterally in front of the motherboard, for a CDROM drive 434. Compact disks may be inserted and removed via an access slot (not shown) located on the lower left side of the front bezel 419. A connector at the rear of the CDROM bay connects the CDROM drive 434 via a ribbon cable 436 to the motherboard 420.

A Power Supply Unit (PSU) 438 is connected to the motherboard via a short harness 40 with two mating connectors 442 and 444 for power and services. The PSU 438 has its own cooling fan 446 and additionally houses the system power switch 448 and power input connector(s) 450.

Figure 11:
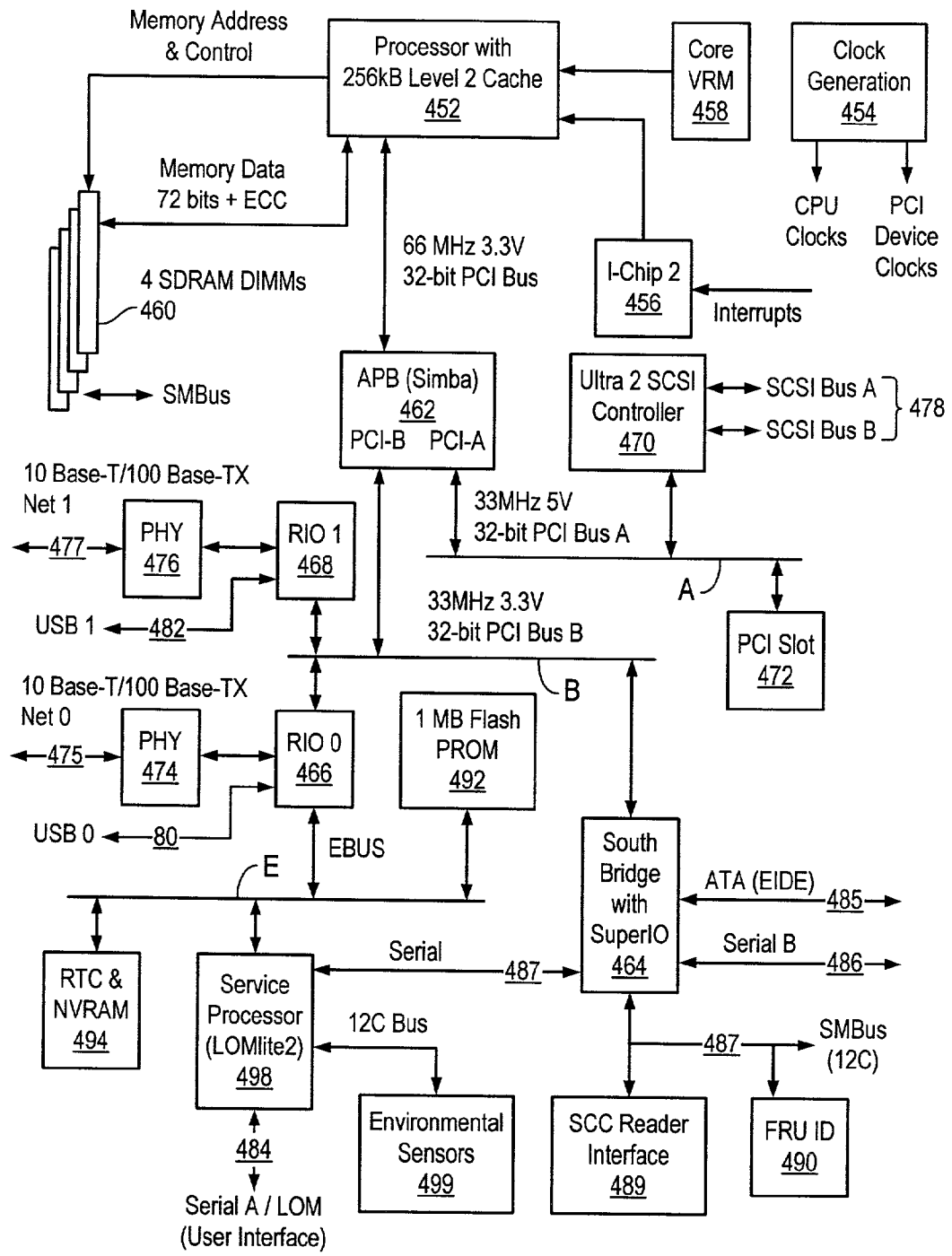
FIG. 11 is a block diagram representing functional elements of the processing unit of FIG. 10.

FIG. 11 is a schematic block diagrammatic representation of the system architecture for the processing unit of FIG. 10.

In this particular example, the CPU 416 of FIG. 11 is an UltraSparc processor 452 available from Sun Microsystems, Inc. In other embodiments other processors could, of course, be used. A configurable clock generator 454 is provided to supply various system clocks. A vectored interrupt Controller (I-Chip2) 456 is provided for handling interrupts. Also provided is a configurable core Voltage Regulator Module (VRM) 458.

Four sockets 425 are provided for commodity DIMMs 460. Connections are provided for a 72 bit data path with Error Correction Codes (ECC). A Personal Computer Interconnect (PCD bus architecture is provided that includes an Advance PCI Bridge (APB) 462. This PCI Bridge 462 concentrates two secondary PCI busses (PCI Bus A and PCI Bus B) onto a primary PCI bus (PCI Bus) as represented in FIG. 11.

A so-called South Bridge 464 is a commodity PCIIO device used extensively in the PC industry. Among other functions, it implements a dual IDE controller, a System Management Bus (SMBus) controller, two Asynchronous Serial Interfaces and a power management controller. The IDE controller component of the South Bridge 464 supports a maximum of four IDE devices via Primary and Secondary ATA busses 485. The (SMBus) host controller provides an I2C compatible, synchronous serial channel 487 for communication with devices sharing the SMBus protocol. The SMBus is used to communicate with the DIMMs. It is also used to communicate with the System Configuration Card (SCC) reader interface 489 (for the portable storage device reader 40), with a chip 490 holding information for identifying a field replaceable unit (FRU ID) to obtain configuration information and with the DIMMs 460.

The two Asynchronous Serial Interfaces provide two serial channels (Serial B and Serial) 486 and 487. The Serial B channel 486 connects directly to provide an external port via an RJ45 connector.

The Serial channel 487 is selectively connectable to an external user interface port (Serial A/LOM) 484 having an RJ45 connector via the service processor 498. The service processor 498 selectively connects the external port 484 to, and disconnects the external port 484 from, the serial channel 487 to enable the external port 484 to be used as a combined Console/LOM port. Serial Universal Asynchronous Receiver/Transmitters (UARTs) are located within the South Bridge 464 for controlling the serial communication.

Two Personal Computer IO (PCIO) devices (RIO 0 and RIO 1) 466 and 468 are also provided. These PCIO devices 466 and 468 are positioned on PCI Bus B. The first PCIO device 466 provides EBUS, Ethernet and Universal Serial Bus (USB) interfaces. EBUS is a Sun Microsystems parallel bus compatible with the so-called Industry Standard Architecture (ISA) bus protocol. The second PCIO device 468 implements Ethernet and USB interfaces.

A dual wide (16 bit) Fast-40 (Ultra2SCSI) controller 470 connects two independent SCSI busses (SCSI Bus A and SCSI Bus B) 478 to the PCI Bus A.

FIG. 11 also illustrates a 1 MB Flash PROM 92 for configuration and boot information, and a Real-time Clock with 8 kB Non-Volatile Random Access Memory (NV RAM) 494.

As shown in FIG. 11, a service processor 498 is also provided. In the present embodiment, the service processor 498 is implemented as an embedded microcontroller module based on the Hitachi H8 series of Flash microcontrollers. The module can be directly incorporated onto a motherboard at very low cost.

The microcontroller 498 can be programmed with microcode to control the reading of the portable storage device 54 via the SouthBridge 464 and the SCC reader interface to the device reader 40 and a selected one or more of the processes described with reference to FIGS. 5A, 5B, 7A and 7B.

Figure 12:
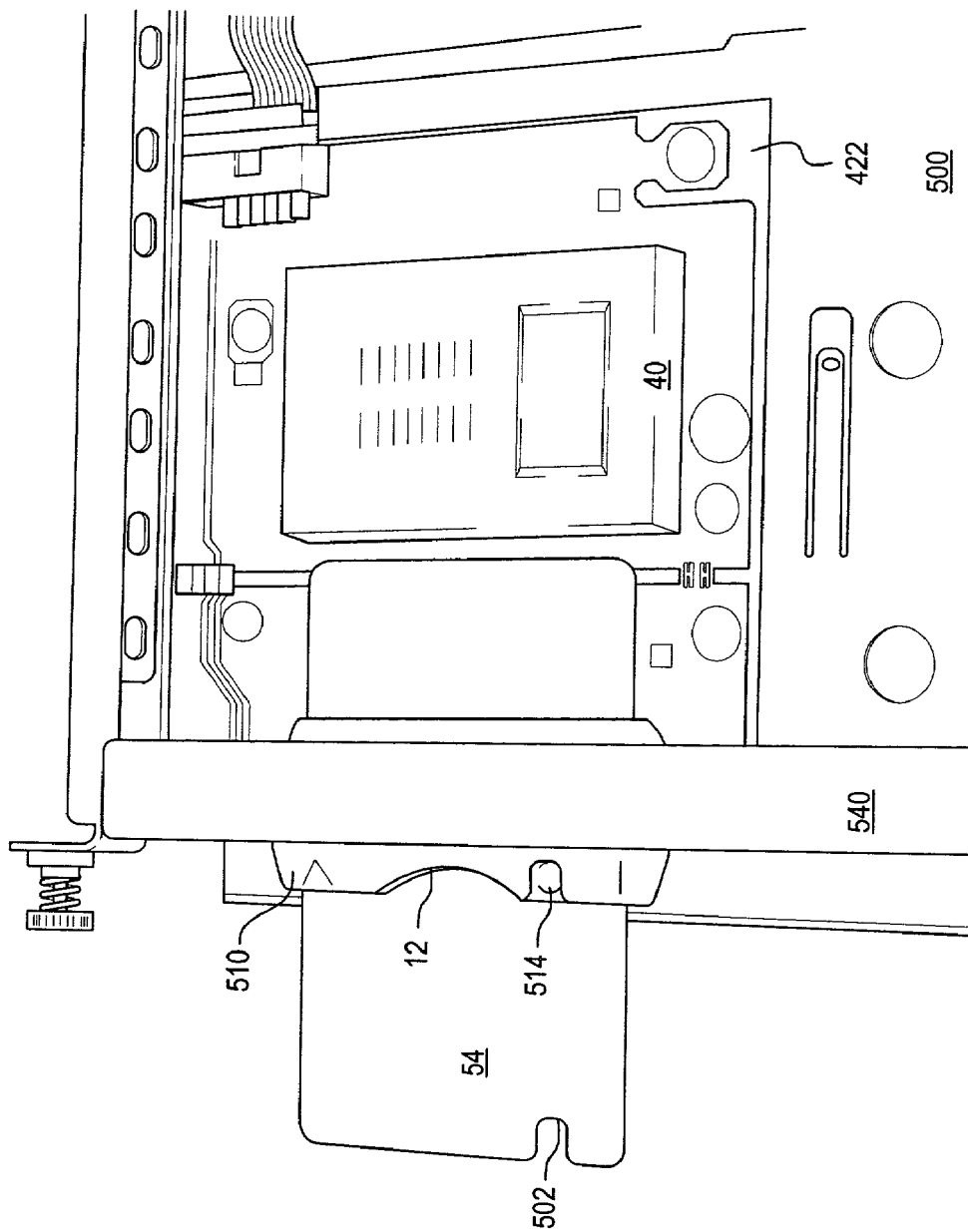
FIGS. 12 and 13 illustrate the insertion of a portable storage device into a device reader in the processing unit of FIG. 10.

FIG. 12 shows a system configuration card 54 being inserted into the device reader 40 that comprises a card receiver 510 and a card reader 40 mounted on the PCB 422 mentioned with reference to FIG. 10.

The system configuration card 54 is shown with the printed circuit on the underside for being read by the card reader 40. The card receiver 510 provides a slot for receiving the system configuration card 54 and for guiding the system configuration card into the card reader 40. The card receiver 510 is provided with a hole 514 through which a locking device can be inserted for securing the card in the inserted position. As shown in FIG. 12, with the card 54 partially inserted, the hole 514 is blocked by the card 54.

Figure 13:
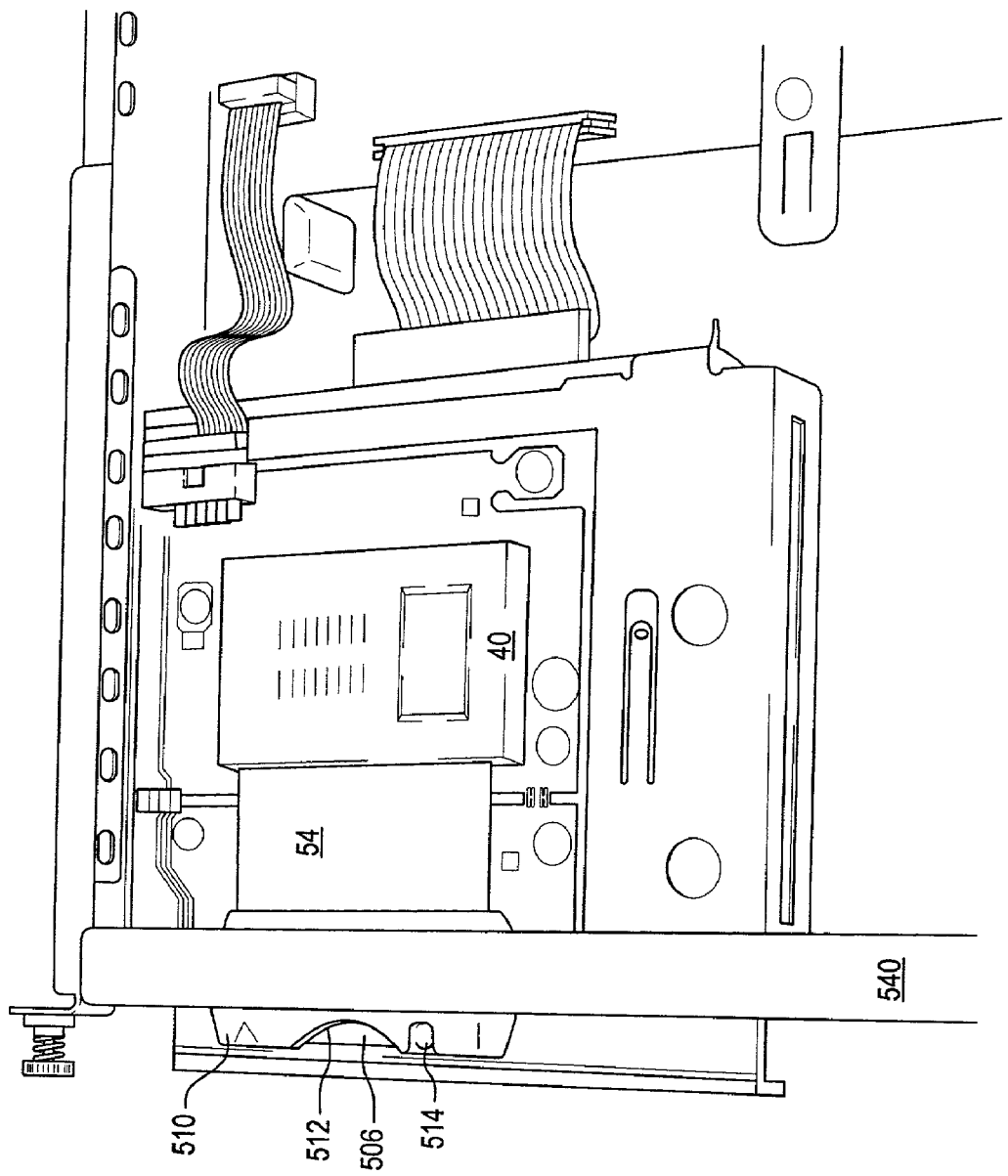

However, when the card 54 is fully inserted, as shown in FIG. 13, at which time the circuit contacts in the card are in contact with card reader contacts (not shown) provided within the card reader 40, the hole 514 in the card receiver 510 aligns with the notch 502 in the card 54. In this position, a locking device, for example a padlock, a wire with a seal, a cable tie, or the like, may be inserted through the hole 514 to lock the card in place. In the fully inserted position as shown in FIG. 13, it will be noted that a small portion 506 of the card 54 is still visible in a recess 512 in the card receiver 510, whereby the end of the card can be gripped to pull the card out of the card reader 40 assuming that a restraint or locking device is not provided through the hole 514 at that time.

A computer program product including a computer program for implementing one or more of the processes described with reference to FIG. 5A, 5B, 7A or 7B can be provided on a carrier medium. The carrier medium could be a storage medium, such as solid state magnetic optical, magneto-optical or other storage medium. The carrier medium could be a transmission medium such as broadcast, telephonic, computer network, wired, wireless, electrical, electromagnetic, optical or indeed any other transmission medium.

There has been described, a processing unit connectable to a communications network. The processing unit has a data carrier reader operable to read a network identity from a portable data carrier. The processing unit is operable on being powered up to check for the presence of a said data carrier, and when a data carrier is present to use the network identity from the data carrier for communicating via the network. The data carrier can be in the form of a card having readable storage, for example a portable storage device having a readable semiconductor memory of a type know, for example, as a smart card, or memory card. The processing unit may be arranged to use only the network address read from the data carrier, and, in the absence of such a data carrier to prevent access to the network. Access to the network can be achieved by aborting the power up of the processing unit. The processing unit may therefore access the network only when the network address is present in the carrier reader when the processing unit is powered up.

As will be appreciated by those skilled in the art, various modifications may be made to the embodiments herein before described without departing from the spirit and scope of the present invention. In particular, although the embodiment of the present invention has been described for an application in which the processing unit is replaceably mounted in a chassis, it will be appreciated that in other embodiments, the processing unit may be any device that is connectable to a communications network. It will be appreciated that in other embodiments the network identity can be provided to such devices through, for example, a memory or smart card and an appropriate card reader. As will be appreciated, memory and smart cards are merely examples of portable data carriers or portable storage devices and that portable storage devices having other formats could be used with an appropriate device reader being provided.

What is claimed is:

1. A processing unit connectable to a communications network, said processing unit comprising:
   a data carrier reader operable to read a network identity from a portable data carrier;
   a read/write register, wherein said processing unit is operable to write said network identity read from said portable data carrier into said read/write register; and
   a register flag operatively associated with said read/write register, wherein said processing unit is operable to set said register flag when said network identity is read from said portable data carrier;
   wherein said processing unit is operable to determine whether said register flag is set and to use said network identity for communicating via said communications network if said register flag is set, wherein if said register flag is not set said processing unit being operable to determine whether said portable data carrier is present in said data carrier reader, wherein if said portable data carrier is present in said data carrier reader said network identity is read from said portable data carrier for communicating via the communications network, said network identity is stored in said read/write register, and said register flag is set, wherein if said portable data carrier is absent from said data carrier reader said processing unit is operable to prevent access to the communications network.

2. The processing unit of claim 1, wherein, after said network identity is stored in said read/write register and said register flag is set, said processing unit is operable to use said network identity stored in said read/write register for communicating via said communications network even if said portable data carrier is removed from said data carrier reader.

3. The processing unit of claim 1, wherein the processing unit is operable, on detecting the absence of said portable data carrier, to record a fault condition.

4. The processing unit of claim 1, wherein said processing unit is operable to determine whether said register flag is set during a power-up sequence, wherein if said register flag is not set the processing unit is operable, on detecting the absence of said portable data carrier, to terminate its power-up sequence.

5. The processing unit of claim 1, wherein the portable data carrier is a memory card and said data carrier reader is a memory card reader.

6. The processing unit of claim 1, wherein said portable data carrier is a smart card and said data carrier reader is a smart card reader.

7. The processing unit as claimed in claim 1, wherein said data carrier reader includes a securing mechanism to hinder removal of said portable data carrier when present in said data carrier reader.

8. The processing unit of claim 1, wherein said processing unit is replaceably mountable in a carrier.

9. The processing unit of claim 8, wherein the carrier is a rack.

10. The processing unit of claim 1, wherein said processing unit is a rack-mountable computer server.

11. The processing unit of claim 10, wherein said rack-mountable computer server includes a service processor, wherein the service processor is operable to control the reading of the network identity from said portable data carrier for communicating via the communications network.

12. A method of operating a processing unit connected to a communications network, said processing unit including a data carrier reader for reading a data carrier, a read/write register, and a register flag, wherein the data carrier includes a network identity for use in communicating via said communications network, wherein the method comprises:
   determining whether the register flag is set;
   if the register flag is set, reading the network identity from the read/write register for communicating via the communications network: and
   if the register flag is not set, determining whether the data carrier is present in the data carrier reader, wherein if the data carrier is present in the data carrier reader the network identity is read from the data carrier for communicating via the communications network, the network identity is stored in the read/write register, and the register flag is set, wherein if the data carrier is absent from the data carrier reader access to the communications network is prevented.

13. The method of claim 12, wherein after the network identity is stored in the read/write register and the register flag is set, the processing unit using the network identity stored in the read/write register for communicating via the communications network even if the data carrier is removed from the data carrier reader.

14. The method of claim 13, further comprising the processing unit, on detecting the absence of said data carrier, recording a fault condition.

15. The method of claim 13, comprising the processing unit determining whether the register flag is set during a power-up sequence, wherein if the register flag is not set the processing unit, on detecting the absence of said data carrier, terminates its power-up sequence.

16. The method of claim 12, further comprising a user manually providing said data carrier including said network identity to said data carrier reader.

17. The method of claim 16, wherein the data carrier is a memory card.

18. The method of claim 16, wherein said data carrier is a smart card.

19. The method of claim 16, further comprising securing said data carrier with respect to said data carrier reader.

20. The method of claim 12, wherein said processing unit is replaceable, further comprising disconnecting a first processing unit from said communications network and connecting a second processing unit to said communications network in place of said first processing unit.

21. The method of claim 12, wherein the processing unit is a rack-mountable computer server, wherein the rack-mountable computer server includes a service processor, further comprising the service processor controlling the reading of the network identity from the data carrier for communicating via the communications network.

22. A computer system comprising:
- a communications network for providing data communications to devices connected to the communications network; and
- at least one processing unit connectable to the communications network, the processing unit comprising:
  - a data carrier reader operable to read a network identity from a portable data carrier;
  - a read/write register, wherein the processing unit is operable to write the network identity read from the portable data carrier into the read/write register; and
  - a register flag operatively associated with the read/write register, wherein the processing unit is operable to set the register flag when the network identity is read from the portable data carrier;
  - wherein the processing unit is operable to determine whether the register flag is set and to use the network identity for communicating via the communications network if the register flag is set, wherein if the register flag is not set the processing unit is operable to determine whether the portable data carrier is present in the data carrier reader, wherein if the portable data carrier is present in the data carrier reader the network identity is read from the portable data carrier for communicating via the communications network, the network identity is stored in the read/write register, and the register flag is set, wherein if the portable data carrier is absent from the data carrier reader the processing unit is operable to prevent access to the communications network.

23. The computer system of claim 22, wherein, after the network identity is stored in the read/write register and the register flag is set, the processing unit is operable to use the network identity stored in the read/write register for communicating via the communications network even if the portable data carrier is removed from the data carrier reader.

24. The computer system of claim 22, wherein said computer system is a server system, wherein the server system includes a service processor which is operable to control the reading of the network identity from the portable data carrier for communicating via the communications network.

* * * * *